Patented May 16, 1950

2,508,271

UNITED STATES PATENT OFFICE 2,508,271

COOLING GASEOUS SUSPENSIONS OF TITANIUM DIOXIDE IN THE PREPARATION OF TITANIUM DIOXIDE PIGMENTS FROM TITANIUM TETRACHLORIDE

Ignace Joseph Krchma, Wilmington, Del., assignor to E. I. du Pont de Nemours & Company, Wilmington, Del., a corporation of Delaware No Drawing. Application June 11, 1947,
Serial No. 754,053

8 Claims. (Cl. 23—202)

This invention relates to novel methods for quickly reducing the temperature of hot, gaseous reaction product suspensions, and more particularly to the quick quenching or cooling of titanium oxide suspensions in hot, halogen-containing vapors.

Many industrial operations require that mixtures of hot gases be rapidly cooled from relatively high, reactive temperatures to relatively low temperatures at which they are inactive. The rapidity of the quenching operation determines the precision with which the reaction can be controlled, this being especially true where the gases contain solid titanium oxide reaction products in suspension. Thus, upon oxidizing a titanium halide, such as the tetrachloride, in the vapor phase to produce pigmentary titanium dioxide, the hot gaseous $TiO_2$-containing suspension obtained must be quickly cooled to a temperature sufficiently low to lessen the corrosive effect of the chlorine-containing gases and to prevent the $TiO_2$ from "growing" to an undesirably large particle size, thereby avoiding any appreciable loss in tinting strength, hiding power, and other essential pigment properties in the final product. It is of prime importance in this type of operation, therefore, that rapid quenching be effected of the reaction products and to a temperature which will enable and assure recovery of a $TiO_2$ product having requisite pigment properties, especially in respect to finely-divided particle size and uniformity. Additionally, it often desirable to quench to such an extent that the by-product gases are cool enough to be filtered or otherwise prepared in conventional equipment, for recycling to aid in the production of further quantities of the $TiCl_4$ by chlorination of titaniferous materials.

Previously, several modes for effecting reactant quenching have been resorted to, including passage of the reaction products in indirect heat exchange relationship about cold, tubular surfaces, or the direct mixing of a cold, inert gas with such reactants. These methods have not been found to be satisfactorily effective for the present purpose. Thus, when resort is had to a cold, inert gas, large volumes of the latter are required and the use of large-scale equipment is rendered necessary. Furthermore, the cooled material becomes highly diluted by such gas, rendering difficult and costly subsequent separation of the reaction products in concentrated form. Resort to indirect cooling apparatus, such as heat exchange tubes, is disadvantageous for the reason that when the hot material comes in contact with the tube surfaces and is cooled, the solid $TiO_2$ particles deposit and adhere to the cold surfaces, gradually building up thereon to form a thick coating thereover. The $TiO_2$ solid being a non-conductor, the end result is that the tubes quickly become insulated, heat transfer is greatly reduced, and the overall efficiency of the apparatus greatly reduced or rendered ineffective altogether.

It is among the objects of this invention to overcome these and other disadvantages which characterize prior cooling methods and to provide novel and effective methods for attaining these objects. Particular objects include the procurement of a quick quenching of a gaseous $TiO_2$-containing suspension; the minimization of $TiO_2$ particle size growth during the quenching operation; the obtainment of by-product gases suitable for use in chlorinating titaniferous materials to prepare $TiCl_4$; the cooling of the gaseous suspension under conditions which afford optimum heat transfer efficiency; minimizing build-up of the solid $TiO_2$ material on the surfaces of the conduits or chamber during the cooling operation; effecting the desired quenching without incurring any substantial dilution of the reaction products under treatment with objectionable foreign substances; the cooling of large volumes of gases in relatively small-size equipment of relatively simple construction; and effecting the quick cooling or quenching of a $TiO_2$ pigment by means of a liquid cooling agent which will not contaminate the pigment or injure its desired properties. Other objects and advantages of the invention will be evident from the ensuing description thereof.

These objects are accomplished in this invention which comprises cooling a hot, reactive, chlorine- and $TiO_2$-containing gaseous suspension to a non-reactive temperature by directly contacting said suspension with a sufficient quantity of a fluid substance in a lower state of energy selected from the group consisting of liquid chlorine and liquid titanium tetrachloride.

In a more specific and preferred embodiment, the invention comprises quickly cooling a hot, reactive titanium oxide pigment-containing gaseous suspension obtained from the vapor phase oxidation of titanium tetrachloride, by directly contacting said suspension with sufficient liquid chlorine or titanium tetrachloride that a substantially instantaneous cooling of said suspension will result and the temperature thereof is reduced at least to the point where continued growth of its $TiO_2$ particles is inhibited.

In practically applying the invention in the preparation, for instance, of pigmentary titanium dioxide, a hot gaseous TiO₂-containing suspension, comprising the hot reaction products (at temperatures ranging from 900° C. to 1350° C.) recovered from the oxidation of titanium tetrachloride, is directly subjected to intimate contact with liquid chlorine or liquid titanium tetrachloride. The titanium tetrachloride so oxidized may comprise that obtained from the chlorination, at temperatures ranging from 700–1150° C., of a metal oxide or titaniferous ore, such as ilmenite, in the presence of a reducing agent, and the TiO₂ suspension treated in accordance with the invention may comprise the reaction products from the vapor phase oxidation of titanium tetrachloride, at temperatures ranging from about 900–1350° C., with air, oxygen, or other oxygen-containing gas, in accordance, for instance, with the disclosure of the co-pending application of Holger H. Schaumann, Ser. No. 653,428, filed March 9, 1946, now Patent No. 2,488,439.

The liquid cooling medium may be conveniently sprayed into a suitable chamber or conduit into or through which the gaseous suspension is being fed or passed. Alternatively, such direct contact may be effected by atomizing or otherwise dispersing said medium into said gaseous reaction products. For example, the TiO₂ suspension may be introduced into a spray chamber and passed upwardly therethrough to come in intimate contact with a descending spray of liquid titanium tetrachloride or chlorine. The added cooling liquid becomes heated by the hot gaseous suspension, the resulting heat absorption causing it to vaporize. The suspension itself is, as a result, correspondingly cooled by the heat exchange.

The amount of cooling fluid used should be sufficient to reduce the temperature of the gaseous suspension under treatment to below the point at which its TiO₂ particles will continue "to grow" rapidly by reason of the cementation or sintering of loose TiO₂ aggregates present. It it sometimes found desirable to cool the suspension from its high reaction temperature to a point where it can immediately be handled in conventional separation and recovery equipment, say, to about 100° C. The present process may be used alone, or in conjunction with other methods, such as conventional tube heat exchangers or the fluidized solids cooler of my co-pending application Ser. No. 751,709, filed June 2, 1947. The present invention may first be used, say to reduce the temperature of the suspension by at least 100° C. within not to exceed 10 seconds' time, known cooling means being then employed to complete the separation. This will insure recovery of a final TiO₂ product, the average particle size radius of which will range from .05 to .5 micron, and preferably will be from .1 to .25 micron. In such small, uniform particle size state, the TiO₂ product will exhibit optimum pigment properties, particularly excellent tinting strength, color, opacity, and other essential characteristics.

The cooled gaseous TiO₂ suspension obtained from such cooling treatments can be conventionally treated in suitable separators, such as of the cyclone type, precipitators, filters of various fabrics such as those described in U. S. 2,404,714, or other commonly-used devices adapted to effect separation and recovery of its various constituents. The chlorine or titanium tetrachloride products recovered in these operations may be again liquefied by any conventional heat exchange procedure and return to the system for reuse in quenching of additional gaseous TiO₂ suspensions being fed to said system for treatment. Alternatively, when chlorine is the cooling agent, it may be recycled to aid in preparing additional TiCl₄, as previously noted, or, as disclosed and claimed in the co-pending application of James E. Booge, Ser. No. 763,176, filed July 23, 1947, the cooled, chlorine-containing gases, after being freed of TiO₂, may be employed as a cooling medium for a hot suspension of TiO₂ in hot chlorine-containing gases.

When TiCl₄ is the coolant, on the other hand, it is practical to effect its condensation before the pigment is completely separated therefrom. For example, the TiO₂ suspension from the oxidation reaction may be cooled by direct contact with a spray of liquid TiCl₄, the quantity of such spray being so selected as to cool the suspension to a temperature of approximately 200° C. The resulting gaseous suspension is then passed through simple cyclones which can separate out a major portion but not all of the pigment. Although separation is thus incomplete, it is entirely practical to condense the titanium chloride directly from this tail gas mixture containing some pigment, by passing the mixture through water-cooled tubular condensers, recovering the TiCl₄ as a liquid having some pigment in suspension. Such a slurry is entirely satisfactory itself for recycling and use in cooling additional quantities of the hot TiO₂ suspension leaving the oxidation furnace.

To a clear understanding of the invention, the following examples are given, which are to be considered as merely in illustration and not in limitation of the invention:

Example I

A gaseous suspension, at a temperature of 1000° C., comprising the reaction products from the vapor phase oxidation of titanium tetrachloride with air, upon discharge from the oxidation vessel was continuously fed at a rate of 82 cu.ft./min. directly into a conventional type spray cooler for passage upwardly therethrough. Said suspension had the following composition: 30% by volume of chlorine; 68.5% nitrogen, 1.4% oxygen, .09% hydrogen chloride, and approximately 0.29 pound of solid TiO₂ in suspension per pound of gases present. The spray cooler was constructed of refractory bricks and its spraying equipment was made of nickel.

Concurrently with such introduction of the gaseous suspension into said cooler, liquid titanium tetrachloride, at a feed rate of 2.6 tons per day or 215 pounds per hour, was continuously discharged from a spray nozzle located in the upper part of said cooler for passage downwardly through said cooler for direct contact with and in a direction countercurrent to the upwardly-flowing gaseous suspension being passed therethrough.

As a result of this treatment, the TiO₂ suspension was quenched by the liquid titanium choride to a temperature of about 300° C., or a drop of 700° C., within 10 seconds. The liquid titanium chloride absorbed the heat from the gaseous and solid materials, becoming itself vaporized and heated to 300° C. The suspension of TiO₂ in the gaseous mixture was then passed into a conventional cyclone separator and thence into a Cottrell precipitator, wherein the TiO₂ pigment was separated out and the tail gases removed. At this point the tail gases were at a temperature of 200° C. They were then passed through a condenser which cooled them to 25° C., to condense out and recover the titanium chloride, for recirculation to and reuse in the spray cooler, together with 8.2 pounds per hour of added, make-up TiCl₄. The remaining gases comprised by analysis: 29.6% by volume $Cl_2$, 1.76% $TiCl_4$, 67.2% $N_2$, 1.34% $Cl_2$, and 0.10% HCl.

*Example II*

A gaseous $TiO_2$ suspension at the same temperature and having the same composition as that of Example I was continuously fed, in the same manner, into the type of spray cooler used in that example, except that the spraying equipment was composed of steel instead of nickel. Concurrent with such introduction, liquid chlorine was sprayed downwardly into the cooling chamber at the rate of 50 pounds/hr. The velocity of the total gases through the spray system was 167 cu. ft./min.

As a result, the $TiO_2$ suspension was quenched by the liquid chlorine to a temperature of about 855° C. (a drop of 145°) within 5 seconds. The liquid chlorine absorbed the heat from the gaseous material, becoming itself vaporized and heated to 855° C. The $TiO_2$ suspension at 855° C. was then contacted with a body of cool sand, in accordance with my copending application Ser. No. 751,709, filed June 2, 1947, to be further quenched thereby to a temperature of 300° C. The sand was subsequently separated therefrom and recooled and recycled for use in quenching additional quantities of the suspension. As in Example I, the cooled suspension of $TiO_2$ in the chlorine-enriched tail gases was then passed successively into a cyclone separator and a Cottrell precipitator, to separate the $TiO_2$ pigment from such tail gases. On their discharge from the precipitator, the tail gases were at a temperature of 200° C. and analyzed at the following concentrations: 38.9% by volume $Cl_2$, 59.8% $N_2$, 1.2% $O_2$, and 0.09 HCl.

Despite the fact that the vapor phase chloride method for titanium oxide production is cyclic, there are always in-process losses of the materials. The chlorine liberated by the reaction of $TiCl_4$ with oxygen is recycled to effect chlorination of additional quantities of the titanium ore. However, some of it is lost, requiring addition of extra, fresh material. In a run of the type just described, the make-up requirement works out practically to 56 pounds per hour of chlorine to be added. Thus, the liquid chlorine at 50 pounds per hour actually added in the present quenching operation substantially met this requirement. Hence, this one operation not only served to quench the hot reaction product gases, but also served to replenish the normal in-process losses of chlorine.

The invention is operatively useful for quenching essentially any gaseous suspension of a titanium oxide or of mixtures of that oxide with other metal oxides in hot corrosive gases, especially chlorine-containing gases.

A critical feature of the invention is the choice of the particular material used to effect the desired quenching. It is essential that one be chosen which will not objectionably contaminate or dilute the tail gases nor injure the $TiO_2$. Liquid chlorine and/or titanium tetrachloride have been found to be outstandingly useful for such purpose. The corrosive gases treated may comprise mixed free chlorine or chlorine chemically combined as chlorides and the like. The chlorine and/or titanium tetrachloride cooling media used must be in a lower state of energy than the tail gases from the process, i. e., must be in either liquid or a solid state. Prior art processes have effected the cooling of hot gases by adding thereto large volumes of a cooler gas. However, the relative heat contents and the corresponding heat transfer efficiency are so low that large volumes of the cold gas must be used, which, as noted, has required the use of expensive large-scale equipment. A normally gaseous liquid will readily absorb large quantities of heat to effect its own vaporization. For instance, in the case of chlorine, the latent heat of vaporization at −30.1° F. is 121 B. t. u. per pound. Furthermore, the volume occupied by such a gas in its liquid state is so small, relatively speaking, that the corresponding equipment needs are greatly simplified. Again using chlorine as an example, 462 volumes of the gas give 1 volume of the liquid.

The quantities of the fluid cooling agent employed herein will depend upon the degree of cooling desired, the amount of material to be cooled, the temperatures of the gaseous suspension and cooling agent, as well as other factors, such as the heat of vaporization of said agent. Preferably, and to insure maximum effectiveness with recovery of a $TiO_2$ pigment of requisite particle size, the amount of cooling media employed herein should be adequate to reduce the hot gaseous $TiO_2$-containing suspension to a less reactive condition (below about 850° C.) in less than 10 seconds after its initial contact with the suspension within the cooling zone; and, as hereinbefore noted, such amount may be employed as will completely cool the suspension to a temperature where it can be practicably handled without further cooling. In a continuous titanium tetrachloride oxidation process using liquid chlorine as the quenching medium, such amount of chlorine is used as will preferably make up the normal losses of the process, as hereinbefore noted. If liquid titanium tetrachloride is employed, the maximum amount should be less than that which will induce cooling to a temperature where any of the cooling agent itself remains in the liquid state. Separation of the pigment by conventional methods such as cyclones or dust filters is more conveniently effected when all of the liquid medium is vaporized in the cooling operation, while the gaseous suspension is cooled to the desired lower temperature. Hence, such quantity as will cool the entire mass below the dew point of the cooling fluid should normally be avoided.

The method by which the added fluid is contacted with the hot materials is also relatively unimportant. Any means known to the art may be used. Particularly satisfactory for use, as already stated, is the so-called ring spray, or the like, wherein the cooling liquid is atomized and sprayed into the gaseous suspensions as a fine mist. Many other means may be resorted to with equally satisfactory results, however, such as impingement on spinning disks, use of two fluid spray nozzles, or the like. The choice thereof is not considered critical to or limitative of the invention, except that direct contact between the cooling medium and gaseous media must be had.

The many advantages of the invention are apparent from the foregoing disclosure. In general, it affords a novel means for effecting cooling hot suspensions of solids in corrosive, chlorine-containing gases by a rapid and efficient direct heat-exchange technique; the avoidance of objectionable dilution of the said gases by foreign substances; minimization of the deleterious effect which build-up of the cooled solids on the surfaces of the quenching system would otherwise incur; the use of relatively smaller volumes of materials in effecting cooling which decreases correspondingly the size and complexity of the equipment required in the quenching operation; and prevention of contamination of the suspension by any substances which would adversely affect the pigment properties of the TiO$_2$ product. The process may be cyclic. When it is, the steps of replenishing normal losses of chlorine and of quenching the oxidation products are combined in one operation to result in advantageous time and economic savings, with accompanying simplification of the entire cooling procedure.

I claim as my invention

1. A method for quickly cooling a reactive, hot chlorine and TiO$_2$-containing gaseous suspension to non-reactive state which comprises directly contacting said suspension after its discharge from a reaction zone in which it is produced with a liquid substance selected from the group consisting of chlorine and titanium tetrachloride.

2. A process for quenching a hot chlorine and TiO$_2$-containing gaseous suspension resulting from the vapor phase oxidation of titanium tetrachloride within a reaction zone which comprises directly contacting said suspension upon its discharge from said zone and while at a temperature ranging from 900–1350° C. with a cooling substance in liquid state selected from the group consisting of chlorine and titanium tetrachloride and in amount sufficient to reduce the temperature of said suspension to below 850° C. within 10 seconds' time.

3. A process for quenching a hot, reactive, gaseous TiO$_2$ suspension obtained from the vapor phase oxidation of titanium tetrachloride to a non-reactive state which comprises subjecting said suspension after its discharge from a reaction zone to direct contact in a cooling zone with liquid chlorine.

4. A process for quenching a hot, reactive, gaseous TiO$_2$ suspension obtained from the vapor phase oxidation of titanium tetrachloride to a non-reactive state which comprises subjecting said suspension after its discharge from a reaction zone to direct contact in a cooling zone with liquid titanium tetrachloride.

5. A method for quenching a TiO$_2$-containing, hot, gaseous suspension from the vapor phase oxidation of titanium tetrachloride to a temperature below that at which the TiO$_2$ particles present therein will continue to increase in particle size, which comprises passing said suspension from the reaction zone in which it is produced into a cooling zone and subjecting it to direct contact therein with the cooling action of a finely-divided spray of liquid titanium tetrachloride.

6. A process for quenching a gaseous TiO$_2$ suspension at a temperature ranging from 900–1350° C. being discharged from a reaction zone wherein said suspension is produced from the vapor phase oxidation of titanium tetrachloride, which comprises subjecting said suspension to direct contact in a cooling zone with an amount of liquid titanium tetrachloride sufficient to reduce the temperature of said suspension within said cooling zone to a temperature below 850° C. within a time period not exceeding 10 seconds.

7. A method for quenching a TiO$_2$-containing gaseous suspension at a temperature ranging from 900–1350° C. obtained from the vapor phase oxidation of titanium tetrachloride within a reaction zone, which comprises passing said suspension from said reaction zone into a cooling zone wherein said suspension is subjected to direct contact with liquid titanium tetrachloride in the form of a finely-divided spray and in amount sufficient to reduce the temperature thereof to below 850° C. within a time period not exceeding 10 seconds.

8. A method for quenching a TiO$_2$-containing gaseous suspension obtained from the vapor phase oxidation of titanium tetrachloride in a reaction zone, comprising passing said suspension upon its discharge from said reaction zone and while at a temperature of about 1000° C. into a cooling zone wherein it is subjected to direct contact with a finely-divided spray of liquid titanium tetrachloride being passed countercurrent to the direction of flow of said suspension within said cooling zone and in amount sufficient to reduce the temperature of said suspension to about 300° C. within 10 seconds' time.

IGNACE JOSEPH KRCHMA.

REFERENCES CITED

The following references are of record in the file of this patent:

UNITED STATES PATENTS

| Number | Name | Date |
| --- | --- | --- |
| 2,340,610 | Muskat et al. | Feb. 1, 1944 |